3,081,189
COPPER PHTHALOCYANINE PIGMENTS CRYSTALLIZATION- AND FLOCCULATION-RESISTANT IN THE α-FORM AND PROCESS FOR THEIR MANUFACTURE
Guenther Zwahlen, Arlesheim, Switzerland, assignor to Ciba Limited, Basel, Switzerland, a Swiss company
No Drawing. Filed Sept. 26, 1960, Ser. No. 58,196
Claims priority, application Switzerland Sept. 29, 1959
4 Claims. (Cl. 106—288)

Among the various modifications of copper phthalocyanine the α-form is known to have the reddest shade and the highest tinctorial power. However, the α-form has the disadvantage that it is not in general resistant to solvents, so that in the presence of many of the solvents used in the lacquer industry, such as benzene, toluene or xylene, it changes fairly rapidly by recrystallization into the more greenish β-form. The large needles of the β-form so produced considerably reduce the tinctorial strength of the pigment and render it to a great extent valueless for practical use.

A further disadvantage of the α-form is its great tendency to flocculate. Due to this the pigment particles dispersed in a liquid agglomerate to form larger particles, which also considerably reduces the tinctorial power of the pigment. Various tests have been devised for determining the flocculation of a pigment. One such test consists, for example, in dispersing 10 parts of copper phthalocyanine and 90 parts of titanium dioxide in an oil-modified alkyd resin and pouring the lacquer on to a support. Shortly after the film has dried it is rubbed with the finger. If the rubbed part of the film is stronger in color than the unrubbed part, flocculation has occurred.

Many attempts have been made to obtain crystallization resistant and flocculation resistant copper-phthalocyanines. Thus, for example, copper phthalocyanine has been mixed with tin phthalocyanine. In order to obtain a mixture that is sufficiently resistant to crystallization and flocculation to meet practical requirements, at least 12 percent of tin phthalocyanine, calculated on the mixture, must be used. As tin phthalocyanine is considerably less fast to light and migration than copper phthalocyanine and also has an undesired strongly greenish blue tint, such a high content of tin phthalocyanine has a very unfavorable effect on the tint and fastness to light and migration of the pigment.

The present invention is based on the observation that mixtures of at least 80 percent of halogen-free and/or low-halogenated copper phthalocyanine with 0.5 to 10 percent of tin phthalocyanine and 0.5 to 10 percent of cobalt phthalocyanine, possess an improved stability, notwithstanding their lower content of tin phthalocyanine. All the percentages herein are by weight.

Especially advantageous mixtures are those consisting of 90 to 95 percent of copper phthalocyanine and/or copper monochloro- or monobromo-phthalocyanine, 2 to 5 percent of tin phthalocyanine and 2 to 5 percent of cobalt phthalocyanine. In addition to these three principal components the mixtures may contain a small proportion of another metal phthalocyanine or metal phthalocyanines.

It is essential for a good resistance to crystallization and flocculation that the components should be very intimately mixed together. This is advantageously achieved by grinding the components, and advantageously using as starting materials the β-forms of the metal phthalocyanines, such as are obtained by the usual methods of synthesis. It is desirable to use a method of grinding that leads directly to highly dispersed α-forms. This can be accomplished by treating the crude pigments in a grinding or kneading apparatus in known manner in the presence of an easily removable grinding substratum, for example, an inorganic or organic salt, such as sodium sulfate, sodium chloride or sodium acetate. Especially advantageous is the conditioning process wherein the pigment mixture is ground in aqueous suspension in the presence of a solid organic grinding substratum capable of subliming, especially hexachlorethane, whereby a highly dispersed and stable α-form is obtained in a relatively short grinding period.

The individual components may be separately conditioned by the methods described above and subsequently mixed together mechanically.

Another method of producing an intimate mixture of the metal phthalocyanines consists in dissolving them in a common solvent, for example, sulfuric acid, and precipitating the mixture of phthalocyanines from the solution for example, by introducing the sulfuric acid solution into water. As tin phthalocyanine is decomposed at higher temperatures by concentrated acids, care must be taken that the temperature of the solution of the mixed phthalocyanines in sulfuric acid does not exceed 20° C. By this method finely dispersed stable α-forms are also obtained.

A further method of obtaining a homogeneous mixture consists in heating a phthalic acid derivative, which is capable of forming phthalocyanine with or without a nitrogen donor, for example, phthalonitrile or phthalimide and urea, with a mixture of salts of copper, tin and cobalt. In this case the β-forms are obtained, which must be conditioned and converted into the α-forms in known manner.

The pigments of this invention possess a resistance to crystallization and flocculation that meets the highest requirements and they are therefore suitable for all applications of pigments, especially in lacquers and spinning solutions.

Mixtures that contain cobalt phthalocyanine in addition to copper and tin phthalocyanine, as compared with mixtures containing only the two last mentioned components, possess the advantages of having less greenish tints and a better fastness to light and migration.

The following examples illustrate the invention, the parts and percentages being by weight:

*Example 1*

An attritor mill of the laboratory type is charged with 61 parts of water, 14 parts of finely pulverized hexachlorethane, 64 parts of an aqueous press cake containing 13.16 parts of α-copper phthalocyanine, 0.42 part of dichloro-tin phthalocyanine (SnCl$_2$—Pc, obtained by heating 59.2 parts of phthalic anhydride, 100 parts of urea, 28 parts of SnCl$_2$, and one part of ammonia molybdate in 200 parts of trichlorobenzene, and heating the mixture first for 6 hours at about 180° C. and then for a further eight hours at 220° C.) and 0.42 part of chlorocobalt phthalocyanine (CoCl—Pc, obtained by heating 102.4 parts of phthalonitrile, 40 parts of CoCl$_2$, and 5 parts of quinoline in 200 parts of trichlorobenzene, for 17 hours at 180 to 190° C. and purified by reprecipitation from H$_2$SO$_4$). After grinding the mixture for 24 hours the mill is discharged, rinsed with water, and the suspension so obtained is freed from hexachlorethane by distillation with steam. The aqueous suspension that remains behind is filtered, and the filter cake washed with water and then dried in a vacuum cabinet at 80° C. By photographing the X-ray diffraction diagram of the product it can be found that the product obtained is the α-modification. The dry product, which can easily be disintegrated by pressure to a soft powder, can be tested in the following manner to determine its resistance to crystallization:

0.5 gram of the pigment is taken up in 10 cc. of xylene and heated for 30 minutes at 100° C. After cooling the mixture it is filtered, and the filter residue is washed with ethanol and dried in a vacuum cabinet at 60° C. From a photograph of its X-ray diffraction diagram it can be found that the pigment mixture is wholly in the α-form.

In addition to its good resistance to crystallization, the pigment obtained has a good resistance to flocculation.

α-Copper phthalocyanine alone, i.e. in the absence of the stabilizing additions, recrystallizes completely when tested in this manner, to form large needles of the β-modification.

By using, instead of 3% each of tin phthalocyanine and cobalt phthalocyanine, 6% of tin phthalocyanine alone as the stabilizing addition the product never contains more than 80% of the α-form when subjected to the above test. By using, instead of 3% each of tin phthalocyanine and cobalt phthalocyanine, 6% of cobalt phthalocyanine alone as stabilizing addition the pigment mixture, when subjected to the above test, recrystallizes completely in the form of large needles of the β-modification.

*Example 2*

An attritor mill of the laboratory type is charged with 112 parts of water, 13.16 parts of crude β-copper phthalocyanine, 0.42 part of dichloro-tin phthalocyanine and 0.42 part of crude chloro-cobalt phthalocyanine that has not been purified by reprecipitation from sulfuric acid. After grinding the mixture for 96 hours at 15 to 20° C., the original needle-shaped crystals 100 to 200 microns long of the starting pigment completely disappear. The pigment is simultaneously converted from the β-modification into the α-modification, which can be determined by photographing the X-ray diffraction diagram of the product in very fine dispersion in hexachlorethane. The mill is then discharged, rinsed with water and the resulting suspension is filtered. The washed filter cake is heated in a vacuum cabinet at 120° C., during which at first mainly the water and then the hexachlorethane are practically completely removed. The dry pigment, which can easily be disintegrated by pressure to a soft powder is again tested for its resistance to crystallization, by heating a test portion of the pigment for 30 minutes in xylene at 100° C. The X-ray diagram indicates that it consists wholly of the α-modification. The pigment also has a good resistance to flocculation.

*Example 3*

120 parts of finely ground sodium chloride, 28.2 parts of of α-copper phthalocyanine, 6.9 parts of chloro-cobalt phthalocyanine, 0.9 part of hydroxy-tin phthalocyanine (obtained by boiling $SnCl_2$—Pc in ammonia) and 50 parts of isopropanol are kneaded for 24 hours, while cooling, in a laboratory kneader. The kneaded mass is taken up in one liter of hot water, and the whole is stirred for one hour, then filtered and the filter residue is washed free from chlorine ions with water. The filter residue is dried in a vacuum cabinet at 60° C., and the pigment so obtained is tested for its resistance to crystallization as described above. Its X-ray diffraction diagram shows that it consists completely of the α-modification.

*Example 4*

As both tin phthalocyanine and cobalt phthalocyanine are stable in cold concentrated sulfuric acid pigment mixtures which contain either or both of these metal phthalocyanines can be converted into the α-modification by reprecipitation from concentrated sulfuric acid. In this case cobalt phthalocyanine has a very marked stabilizing action and the above mentioned advantages of cobalt phthalocyanine over tin phthalocyanines are especially pronounced.

4.7 parts of crude β-copper phthalocyanine, 0.15 part of cobalt phthalocyanine and 0.15 part of chloro-tin phthalocyanine are dissolved in 50 parts of concentrated sulfuric acid at 15 to 20° C. When dissolution is complete, the sulfuric acid solution is run from a dropping funnel in the form of a thin stream into 100 parts of water and 170 parts of ice, while stirring. The whole is stirred for a further hour, then filtered, and the filter residue is washed free from acid. The filter cake so obtained is dried in a vacuum cabinet at 60° C. The pigment so obtained has a very good resistance to crystallization. Even when it is boiled under reflux in xylene (boiling at 132° C.) for 8 hours, it wholly retains its α-form.

By using, instead of 0.15 part each of tin phthalocyanine and cobalt phthalocyanine, 0.3 part of cobalt phthalocyanine alone as stabilizing addition, there is obtained a pigment which, after being heated at 100° C. in xylene for 30 minutes, contains up to 85% of the α-modification.

What is claimed is:

1. Copper phthalocyanine-pigments, which are crystallization- and flocculation-resistant in the α-form and consist essentially of an intimate mixture of at least 80 percent of a member selected from the group consisting of copper phthalocyanine mono-halogenated copper phthalocyanine and mixtures thereof, 0.5 to 10 percent of tin phthalocyanine and 0.5 to 10 percent of cobalt phthalocyanine.

2. Copper phthalocyanine pigments as claimed in claim 1, in which the copper phthalocyanine component is a member selected from the group consisting of copper phthalocyanine copper monochloro- and monobromo-phthalocyanine and mixtures thereof.

3. Copper phthalocyanine pigments as claimed in claim 1, which consist essentially of 90 to 95 percent of the copper phthalocyanine component, 2 to 5 percent of cobalt phthalocyanine and 2 to 5% of tin phthalocyanine.

4. Copper phthalocyanine pigments as claimed in claim 1, consisting substantially of about 94 percent of copper phthalocyanine, about 3 percent of tin phthalocyanine and about 3 percent of cobalt phthalocyanine.

References Cited in the file of this patent

UNITED STATES PATENTS

| 2,476,950 | Beard | July 26, 1949 |
| 2,713,005 | Baunsgaard et al. | July 12, 1955 |
| 2,891,964 | Roberts | June 23, 1959 |

FOREIGN PATENTS

| 551,607 | Canada | Jan. 14, 1958 |